Patented Jan. 21, 1936

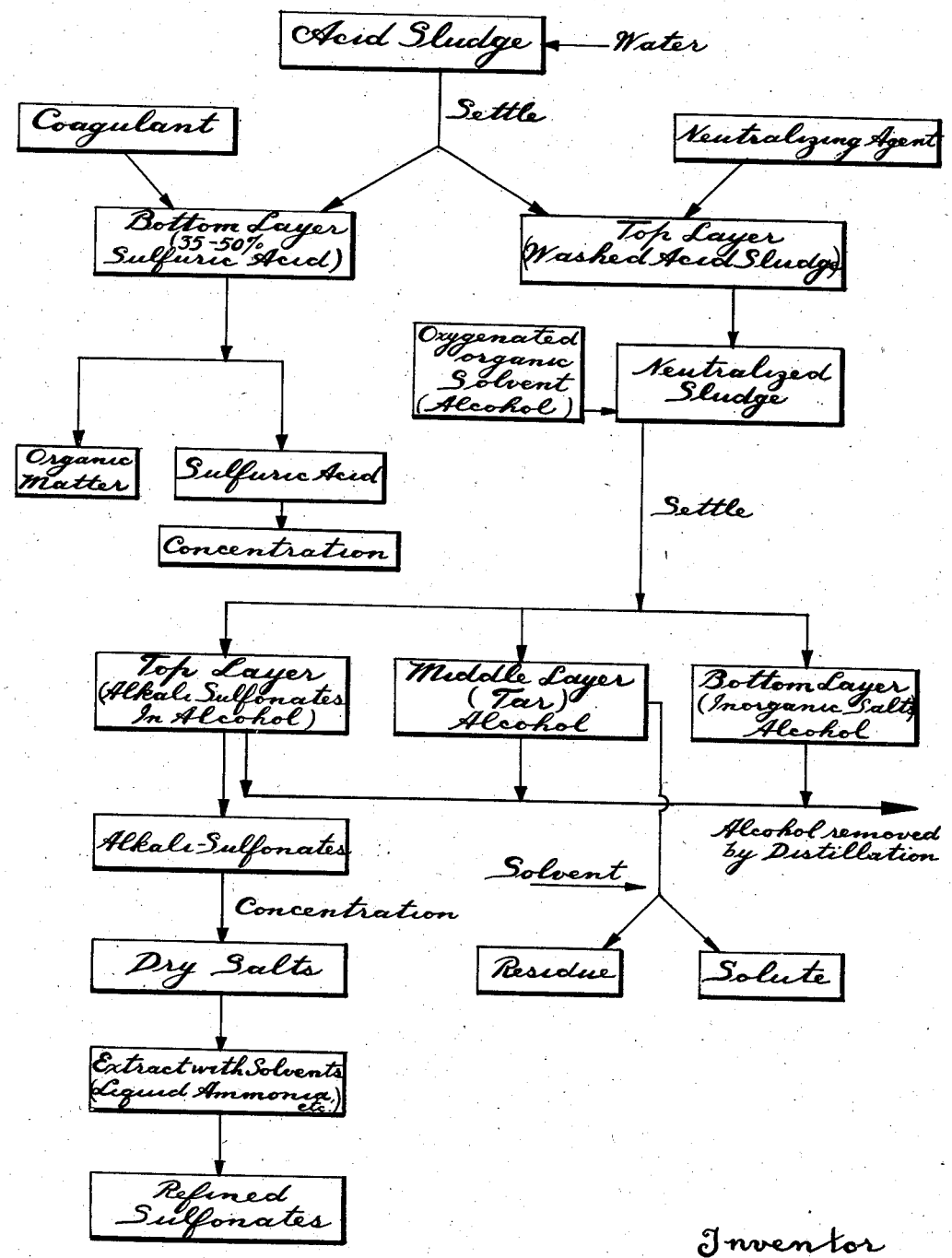

2,028,185

UNITED STATES PATENT OFFICE 2,028,185

PROCESS FOR OBTAINING VALUABLE PRODUCTS FROM ACID SLUDGE

John C. Bird, Elizabeth, N. J., assignor to Standard Oil Development Company, a corporation of Delaware Application January 9, 1932, Serial No. 585,707

23 Claims. (Cl. 260—159)

This invention relates to a new and improved process for obtaining a separation of the components of hydrocarbon oil acid sludge and for obtaining valuable products therefrom. This invention relates especially to the use of oxygenated organic solvents as selective solvents for the extraction or precipitation of valuable products from acid sludge.

When hydrocarbon oils such as petroleum oils, coal tar distillates, products of liquefaction of coal, lignite, peat, etc. and their distillation or conversion products of destructive distillation, hydrogenation, destructive hydrogenation and the like are treated with strong sulfuric acid or sulfuric anhydride, a by-product commonly known as acid sludge is formed. This product is normally heavier than the oil treated and separates as a bottom layer, especially when the treating is conducted with strong or fuming sulfuric acid. This sludge is usually considered to consist of various components, especially of sulfonic acids, other organic material, and excess sulfuric acid, some of which are in solution while others are colloidally dispersed throughout the sludge.

This invention embodies using oxygenated organic solvents for the separation of such components of acid sludge.

One object of this invention is to obtain as a separate product the sulfonic acids of a petroleum oil acid sludge. Another object of this invention is to obtain as a separate product the free sulfuric acid present in acid sludge by an improved process which enables the acid to be recovered with considerably less dilution with water than has heretofore been considered necessary, and with some sludges enables the acid to be recovered in substantially the original acid concentration used.

Still another object of this invention is to obtain as a separate product from acid sludge a viscous or plastic organic substance possessing unusual properties of being markedly resistant to combustion and incapable of supporting its own combustion.

Various methods of obtaining sulfonic acids from aqueous solutions of the sludge resulting from the sulfonation of mineral oils have been already described. These methods in general have been applied only to the treatment of fractions of relatively low boiling point, such as illuminating oils, burning oils and kerosene, obtained from naphthenic base crudes such as Baku. It has been stated that the sludge obtained by sulfonating such oils is substantially completely soluble in water with the formation of clear, dark colored liquids of a rose purple color. These light oils and the sulfonates obtained therefrom are of relatively low molecular weight compared to the sludges and products of this invention, and their treating is much simpler. This invention relates especially to the treatment of acid sludges obtained from asphaltic or mixed base crudes such as Ranger and Burkburnett, heavy residual petroleum oils of high molecular weight, heavy lubricating oils and medicinal white oils. The sludges obtained from these oils, especially from those of an asphaltic or paraffinic base, contain material of an asphaltic nature not found in the light oil sludges and these sludges have heretofore been considered a highly objectionable waste product suitable only for fuel. The herein described process renders these waste sludges, which are produced in almost unlimited quantities as compared with the light oil sludges, available for the production of products of great value.

The drawing is a diagrammatic flow sheet representing one method of operation of my process, and will be understood from the following description:

Acid sludge, such as that obtained by treating white oil stock with strong sulfuric acid, is mixed with water in such proportion to give after settling an aqueous bottom layer containing approximately 35% to 50% sulfuric acid. With this concentration the mutual solubilities of sulfuric acid and the other components of the acid sludge appear to be the lowest.

The bottom aqueous acid layer is withdrawn to be reconcentrated but before such concentration it may be desirable to remove organic matter still remaining in the acid by coagulating the latter by the addition of ions bearing opposite charges and generally additions of small amounts of salts of polyvalent metals such as aluminum chloride, iron chloride and the like are suitable.

When the raw sludge contains a very large amount of asphaltic matter, as is found in "first treat" sludges from the first acid contact with heavy residual asphaltic or mixed base petroleum oils, the initial dilution with water and heating with steam may cause a separation of oil, as a supernatant layer, and of a tarry or asphaltic precipitate. It is preferred to remove both these products before proceeding with the neutralization and/or solvent extraction of the sludge.

The top layer in the sludge dilution step is called "washed acid sludge". It is neutralized with sodium carbonate or hydroxide or other alkali or ammonia. An oxygenated organic solvent such as methyl, ethyl or isopropyl alcohol is added to the neutralized sludge until the mixture contains above about 30 to 60% alcohol. During this operation the temperature is preferably kept at substantially room temperature although higher or lower temperatures may be used.

Upon standing a separation occurs and after 3 to 10 hours an aqueous water-white bottom layer is formed. This consists mainly of a supersaturated solution of inorganic salts which sets to a crystalline mass on longer standing or on cooling. A layer of viscous tar forms above this bottom layer. The uppermost layer consists of a solution of purified alkali sulfonates in alcohol. This layer is separately withdrawn. The alcohol may be recovered therefrom by distillation and the solution remaining contains alkali sulfonates of markedly improved properties with respect to color, solubility and wetting power when compared to the sulfonates prepared directly by neutralizing acid sludge. This solution may be used as obtained or after concentration or evaporation to dryness. The sulfonates may be incorporated in soaps to improved their detergent properties as claimed in co-pending application Serial No. 606,758. For example, it has been found that when small amounts, such as from ½ to 1% up to about 5 to 10%, of these sulfonates are added to soap mixtures, especially to soft potassium soaps of vegetable oils, the soap tends to harden. The syneresis or sweating of the soap is also retarded so that soaps which have the objectionable quality of separating liquids on standing do not do so if incorporated with ½% to about 5% of sulfonates. However, if the proportion of sulfonates is increased above about 10% the soap becomes more and more liquid until at a sulfonate concentration of about 30 to 50% the soap becomes very fluid and is even capable of being poured.

Emulsification of oil soluble or mahogany sulfonates with water is aided by the addition of small amounts of these alkali sulfonates obtained from sludge acids. These alkali sulfonates are such excellent wetting agents as to be of considerable value in assisting in removing suspended matter from gases such as smokes, fogs, dust in air, and the like when added in small amounts to a scrubbing liquid with which such gases are contacted. These sulfonates may also be used to impregnate paper towels, blotting paper or other porous, fibrous, or textile materials in order to increase their absorptive power. They are also suitable for lining rubber tire moulds and for similar uses in vulcanization to prevent sticking of rubber. The purified sulfonates herein described are especially suitable for this use since they may be obtained in concentrations as high as 65% in aqueous liquid solutions while sulfonates prepared by ordinary methods can not be obtained in liquid form in concentrations above about 45%. These sulfonates may also be chlorinated to produce a shellac-like, non-inflammable resin as claimed in co-pending application Serial No. 569,356.

When a more highly refined product is desired the sulfonates may be extracted with liquid ammonia as claimed in co-pending application Serial No. 585,158 or sulfur dioxide at low temperature or high pressure. The lighter colored salts are dissolved by the ammonia and may be recovered upon evaporation of the solvent. Sulfur dioxide dissolves oil and coloring matter, leaving the purified salts as a residue.

The alcohol remaining in the tarry and sulfate layers may be recovered by distillation therefrom. The sodium sulfate produced by this process is of a pure white crystalline type capable of being used where the pure sulfate is desired.

The tarry matter constituting the layer above the sodium sulfate crystals is a semi-plastic resinous substance that possesses numerous commercial uses as claimed in co-pending application Serial No. 592,448.

The product is somewhat brittle at room temperature and breaks with a pitch-like fracture, although in thin sheets it bends readily without breaking. It softens on heating, and may be moulded into any suitable shapes. It burns with difficulty when in contact with a free flame, as from a gas burner, but ceases burning as soon as it is removed from the flame. It is substantially non-corrosive. It is completely soluble in benzol, toluol, xylol, and other hydrocarbon solvents of high solvent power for gums, resins, nitrocellulose, etc., such as the hydro-formed solvents described in the co-pending application Serial No. 583,703 filed December 29, 1931 by Robert T. Haslam, and also in carbon tetrachloride, carbon disulfide and other solvents. It is partially soluble in light hydrocarbon solvents such as petroleum ether and liquefied hydrocarbon gases, and may be separated into two fractions by these solvents. The total product or the fraction extracted with light hydrocarbon solvents, may be used in suitable solvents for the preparation of surface coating and impregnating substances generally. It may be used with volatile solvents as a stain as claimed in co-pending application Serial No. 585,160, and in admixture with solvents, drying oils, pigments, fillers, cellulose plastics, plasticizers, resins and other materials as are used in the preparation of paints, varnishes, lacquers, and the like. It may also be used in admixture with high melting waxes and oils for the wax impregnation of wood, and is valuable as a staining agent and preservative. It may also be employed in wood preservatives, waterproofing agents, emulsifiers and petroleum oil emulsion breakers. The total product, or the residue from a light hydrocarbon solvent extraction is suitable for use as an improved combustion-retarding substitute for asphalt in battery compounds, insulation, roofing materials, etc. It may also be used as a binder for wallboard and the like, with or without fire-proofing materials such as metallic salts, etc. It is superior to ordinary asphalt, since it automatically extinguishes itself when the igniting flame is removed.

The following example will describe a specific instance employing the invention disclosed above:

*Example 1.*—50 pounds of an acid sludge obtained by treating "white oil" stock with sulfuric acid was mixed with 52.5 pounds of water and agitated at about 90° C., steam being blown through the mixture to drive off the sulfur dioxide. After several hours steaming under these conditions, the mixture was allowed to stand and settle for about 3 to 4 hours.

The bottom layer containing sulfuric acid was drawn off, and the top layer was neutralized with 16.7 pounds of 50% caustic soda solution. Approximately 94 pounds of 91% isopropyl alcohol was then added, and the mixture was allowed to stand over night.

After standing, the top layer of the alcohol extract was drawn off and the alcohol distilled off at about 90 to 92° C., after which the liquor was transferred into a steam jacketed pan and evaporated down to dryness. A yield of 50.3% of sodium sulfonates of good color and wetting properties was obtained, based on the original sludge.

The tar and sodium sulfate left in the treating vessel were separated and found suitable for the various uses described herein.

The heating of the sludge to drive out sulfur dioxide may be eliminated. If this heating step is not used, sodium sulfite will also be found in the organic salt layer but any decomposition of the sulfonates due to heating is thereby avoided and the sulfonate produced is superior to that obtained above. It is preferable that all treatment of acid sludge before neutralization be conducted at temperatures below about 130° C.

Other oxygenated organic solvents may be substituted for isopropyl alcohol in the above process. Among these may be mentioned the liquid aliphatic alcohols such as methyl, ethyl, secondary butyl and amyl alcohol, aromatic alcohols such as benzyl alcohol, ethylene glycol and its homologues, other hydroxy organic solvents such as phenol, cresols and the like and other solvents such as the aldehydes, ketones, organic acids and esters. The water soluble solvents act as above described causing a separation of tarry matter and inorganic salts, while the relatively water insoluble solvents such as the higher alcohols, which are not completely miscible with water, form a solution containing substantially all the organic matter of the acid sludge. While either of these classes of solvents may be used for treating either the original washed or neutralized acid sludge, it is preferred to use the water insoluble solvents for extracting acid sludge prior to neutralization since with these solvents substantially pure sulfuric acid may be separated. It is preferred to use the water soluble solvents for extracting neutralized sludge since by this method sulfonates of high purity and free from inorganic salts may be directly obtained.

The extraction with a water insoluble oxygenated organic solvent is described in the following example:

*Example 2.*—300 grams of a white oil sludge obtained as described in Example 1, are diluted with 400 cc. of water and mixed with 500 cc. of secondary butyl alcohol. On standing the mixture separates into two layers, the lower consisting of a substantially colorless solution of sulfuric acid containing a small amount of alcohol, while the upper layer contains substantially all the organic matter originally in the sludge. The extraction may also be conducted with countercurrent flow of alcohol to sludge, or repeated batch extraction may be used, if desired. The layers are separately withdrawn and the alcohol recovered from each by distillation.

If the alcohol used is previously saturated with water the predilution of the sludge may be unnecessary. It is usually preferred, however, especially with a crude oil first treat sludge which contains a relatively high concentration of organic matter to dilute or wash the sludge with water prior to the alcohol extraction. With the sludges containing smaller amounts of organic matter such as the second and third treat sludges obtained in the preparation of white oils no dilution is necessary and a separation of clear concentrated sulfuric acid may be directly obtained.

This extraction with a water insoluble solvent may also be used as a preliminary purification of the acid sludge prior to the separation of alkali sulfonates as described in Example 1. It may also be used for extracting organic matter from the dilute acid obtained on "washing" acid sludges.

The preliminary purification of the acid sludge may also be accomplished by other methods. For example, the sludge after neutralization with an alkali, may be cooled to about 0 to —5° C. whereon impurities are precipitated and the supernatant liquor may be used as above. Water insoluble tarry material may also be extracted from the sludge by contact with benzol and similar hydrocarbon solvents.

This invention is not to be limited to any theory of the composition of the products I obtain from acid sludge nor to any examples given herein for purpose of illustration, but only by the following claims in which I wish to claim all novelty insofar as the prior art permits.

I claim:

1. A process for obtaining a separation of components of acid sludge comprising contacting the sludge with an oxygenated organic solvent not completely miscible with the sludge or with water, and obtaining a separation of the contacted sludge and solvent into a plurality of phases each containing a component originally in the sludge.

2. A process for obtaining pure sulphuric acid from acid sludge which comprises contacting said acid sludge with an oxygenated organic solvent, adding water, and obtaining a separation of the mixture into a substantially pure sulphuric acid phase and a phase containing substantially all of the organic matter of the sludge in the organic solvent.

3. A process for obtaining pure sulphuric acid from acid sludge which comprises contacting said acid sludge with tertiary amyl alcohol and obtaining a separation of the mixture into a substantially pure sulphuric acid phase and a phase containing substantially all of the organic matter of the sludge in the organic solvent.

4. A process for obtaining useful products from an acid sludge obtained by action of strong sulfuric acid on a heavy asphaltic base petroleum oil comprising washing said sludge with water and thereby extracting free sulfuric acid, neutralizing the washed sludge with a compound selected from the group consisting of the alkali metal bases and ammonia, contacting the neutralized sludge with an aqueous alcohol to obtain a separation of the contacted sludge and alcohol into separate phases comprising first, tarry matter, second, inorganic salts, and third, a solution of sulfonates in aqueous alcohol, separately withdrawing the third phase and recovering the alcohol from all three phases.

5. Process according to claim 4 in which an aliphatic alcohol is contacted with the neutralized sludge.

6. Process according to claim 4 in which isopropyl alcohol is contacted with the neutralized sludge.

7. Process according to claim 4 in which the tarry matter is separately withdrawn as an improved product having desirable properties as a difficultly combustible plastic.

8. Process according to claim 4, in which the tarry matter is subjected to extraction by a light hydrocarbon solvent and the residue is separately withdrawn as an improved product having desirable properties as a difficultly combustible plastic.

9. A process for obtaining useful products from an acid sludge obtained by action of strong sulfuric acid on a heavy asphaltic base petroleum oil comprising washing said sludge with water and thereby extracting free sulfuric acid, neutralizing the washed sludge with a compound selected from the group consisting of the alkali metals and ammonia, adding isopropyl alcohol to the neutralized sludge to obtain a mixture of sludge and alcohol containing more than 30% alcohol, allowing the mixture to stand whereby tar and inorganic salts settle out, leaving a supernatant, liquid layer containing sulfonates, separately withdrawing said layer, and recovering sulfonates therefrom.

10. Process according to claim 9 in which the sludge and alcohol mixture contains approximately 60% alcohol.

11. A process for obtaining a separation of components of acid sludge comprising contacting the sludge with an alcohol not completely miscible with water or with said acid sludge, and obtaining a separation of the contacted sludge and alcohol into separate liquid phases comprising first, a solution of substantially all the organic matter of the sludge in the alcohol and second, a solution containing sulfuric acid and water, and separately withdrawing the phases.

12. Process according to claim 11 in which secondary butyl alcohol is contacted with the sludge.

13. A process for obtaining useful products from an acid sludge obtained by action of strong sulfuric acid on a heavy asphaltic base petroleum oil comprising contacting an alcohol not completely miscible with water with said sludge in the presence of sufficient water to cause the formation of two liquid phases, one liquid comprising a solution containing alcohol and organic matter originally in the acid sludge and the other liquid comprising sulfuric acid and water, and separately withdrawing the two liquids.

14. Process according to claim 13 in which the alcohol is a liquid aliphatic alcohol.

15. Process according to claim 13 in which the alcohol is secondary butanol.

16. The process of treating acid sludge which comprises separating a large proportion of the sulfuric acid therefrom, adding a neutralizing agent, treating the remaining sludge with an oxygenated organic solvent in such amount and concentration as to cause the sludge to separate into three phases comprising first, an aqueous solution of inorganic salts; second, tarry matter; and third, a solution of sulfonates in the oxygenated organic solvent and separating said three phases.

17. Process according to claim 16, in which the acid is separated from the acid sludge by treating said acid sludge with an oxygenated organic solvent, thereby forming two phases comprising an acid phase and a sludge phase, removing the acid phase and separating the solvent from the sludge phase.

18. Process according to claim 16, in which the oxygenated organic solvent contains more than two carbon atoms.

19. Process according to claim 16, in which the oxygenated organic solvent is isopropyl alcohol.

20. Process according to claim 16, in which the sulfonate phase is subjected to distillation to remove the solvent and the sulfonate salt residue is further purified.

21. In the recovery of purified sulfonation products from a mixture thereof with inorganic compounds, the step which comprises extracting the sulfonation products from the inorganic compounds by treating said mixture with a substantially water-insoluble alcohol in which said sulfonation products are soluble.

22. Process according to claim 21 in which said mixture comprises an acid sludge resulting from the treatment of a petroleum oil with sulfuric acid.

23. Process according to claim 21 in which said mixture comprises a petroleum oil acid sludge which has been previously washed with water to remove free sulfuric acid.

JOHN C. BIRD.